United States Patent
Fogarty et al.

(10) Patent No.: US 10,423,890 B1
(45) Date of Patent: Sep. 24, 2019

(54) SYSTEM AND METHOD FOR SYNTHESIZING DATA

(71) Applicant: CIGNA Intellectual Property, Inc., Philadelphia, PA (US)

(72) Inventors: David Fogarty, Old Greenwich, CT (US); Jing Lin, Tseung Kwan O (HK)

(73) Assignee: Cigna Intellectual Property, Inc., Wilmington, DE (US)

( * ) Notice: Subject to any disclaimer, the term of this patent is extended or adjusted under 35 U.S.C. 154(b) by 545 days.

(21) Appl. No.: 14/567,432

(22) Filed: Dec. 11, 2014

Related U.S. Application Data

(60) Provisional application No. 61/915,094, filed on Dec. 12, 2013.

(51) Int. Cl.
  *G06N 20/00* (2019.01)
  *G06N 5/04* (2006.01)

(52) U.S. Cl.
  CPC .............. *G06N 20/00* (2019.01); *G06N 5/047* (2013.01)

(58) Field of Classification Search
  CPC .............................. G06N 99/005; G06N 5/047
  USPC .......................................................... 706/12
  See application file for complete search history.

(56) References Cited

U.S. PATENT DOCUMENTS

| | | | | |
|---|---|---|---|---|
| 6,647,146 B1 * | 11/2003 | Davison | ................... | G06T 7/564 358/1.9 |
| 6,963,975 B1 * | 11/2005 | Weare | ................... | G10L 19/018 704/E19.009 |
| 2007/0067304 A1 * | 3/2007 | Ives | ........................ | G06Q 30/02 |
| 2009/0275306 A1 * | 11/2009 | Kraft | ....................... | H04H 60/74 455/344 |
| 2013/0124474 A1 * | 5/2013 | Anderson | ......... | G06F 17/30286 707/634 |
| 2014/0283061 A1 * | 9/2014 | Quinlan | .............. | H04L 63/1408 726/23 |
| 2015/0095310 A1 * | 4/2015 | Beaurepaire | .......... | G06F 3/0484 707/722 |
| 2017/0235848 A1 * | 8/2017 | Van Dusen | ....... | G06F 17/30979 705/12 |

OTHER PUBLICATIONS

An et al., "Multiple Imputation: An Alternative to Top Coding for Statistical Disclosure Control", Journal of the Royal Statistical Society, Feb. 2007, 170, part 4, pp. 923-940.
Fienberg, "A Radical Proposal for the Provision of Micro-Data Samples and the Preservation of Confidentiality", Technical Report, Department of Statistics, Carnegie Mellon University, 1994, 6 pages.

(Continued)

*Primary Examiner* — Li Wu Chang
(74) *Attorney, Agent, or Firm* — Morgan, Lewis, & Bockius LLP

(57) ABSTRACT

A single data record is identified from a first set of data. The first set of data comprises a first plurality of data records, each of the data records including multiple items of data describing an entity. Using pattern recognition, the single data record is processed to identify a group of records from within the first set that have corresponding characteristics equivalent to the single data record. A score for each of the records in the first set is determined. The score describes how similar each of the records in the first set is to the single data record.

9 Claims, 3 Drawing Sheets

(56) References Cited

OTHER PUBLICATIONS

Gelman, "Method of Moments using Monte Carlo Simulation", Journal of Computational and Graphical Statistics, 1995, 4(1) pp. 36-54.
Hart, "The Condensed Nearest Neighbor Rule", IEEE Transactions on Systems, Oct. 1967, IT-14, pp. 515-516.
Kennickell et al., "Multiple Imputation and Disclosure Protection: The Case of the 1995 Survey of Consumer Finances", Record Linkage Techniques, 1997, pp. 248-267.
Kinney et al., "Making Public Use, Synthetic Files of the Longitudinal Business Database", Proceedings of the Joint Statistical Meetings, 2007, pp. 1-9.
Nock et al., "Boosting k-NN for Categorization of Natural Scenes", Computer Vision and Pattern Recognition, May 2010, 100, pp. 294-314.
Raghunathan et al., "Multiple Imputation for Statistical Disclosure Limitation", Journal of Official Statistics, 2003, 19(1), pp. 1-16.
Reiter, "Multiple Imputation for Disclosure Limitation: Future Research Challenges", Journal of Privacy and Confidentiality, 2009, 1(2), pp. 223-233.
Rosenbaum et al., "Reducing Bias in Observational Studies Using Subclassification on the Propensity Score", Journal of the American Statistical Association, Sep. 1984, 79(387), pp. 516-524.

\* cited by examiner

SYSTEM AND METHOD FOR SYNTHESIZING DATA

CROSS REFERENCE TO RELATED APPLICATIONS

This application claims priority to U.S. Provisional Patent Application No. 61/915,094, filed Dec. 12, 2013, which application is hereby incorporated by reference in its entirety.

FIELD OF THE INVENTION

The invention relates to methods for synthesizing data to form synthesized data sets.

BRIEF SUMMARY OF THE INVENTION

The present invention relates to systems and methods for constructing sets of synthetic data. A single data record is identified from a first set of data. The first set of data comprises a first plurality of data records, each of the data records including multiple items of data describing an entity. Using pattern recognition, the single data record is processed to identify a group of records from within the first set that have corresponding characteristics equivalent to the single data record. The identified group of records comprises a target set of variables and the group of records from the first set that are not identified comprises a control set of variables. The target set of variables and the control set of variables are processed, using probability estimation and optimization constraints, to determine a score for each of the records in the first set. The score describes how similar each of the records in the first set is to the single data record. The records associated with a percentage of the highest scores are identified. The data associated with the single data record is replaced with data associated with the identified records identified, item-by-item.

In some embodiments, an original set of data comprising an original plurality of data records is received. Each data record includes multiple items of data describe an entity. Any data record in the original plurality of data records comprising a data item that is a number of standard deviations from a mean of values for that same data item in the original plurality of data records is identified. All records identified in the previous step are removed from the original set of data to generate a first set of data records comprising a subset of the original plurality of data records.

In still further embodiments, a second single data record is identified from the first set; and the foregoing process is performed on the second single data record.

BRIEF DESCRIPTION OF THE DRAWINGS

The foregoing summary, as well as the following detailed description of embodiments of the invention, will be better understood when read in conjunction with the appended drawings of an exemplary embodiment. It should be understood, however, that the invention is not limited to the precise arrangements and instrumentalities shown.

In the drawings.

DETAILED DESCRIPTION OF EMBODIMENTS OF THE INVENTION

Figure 1:
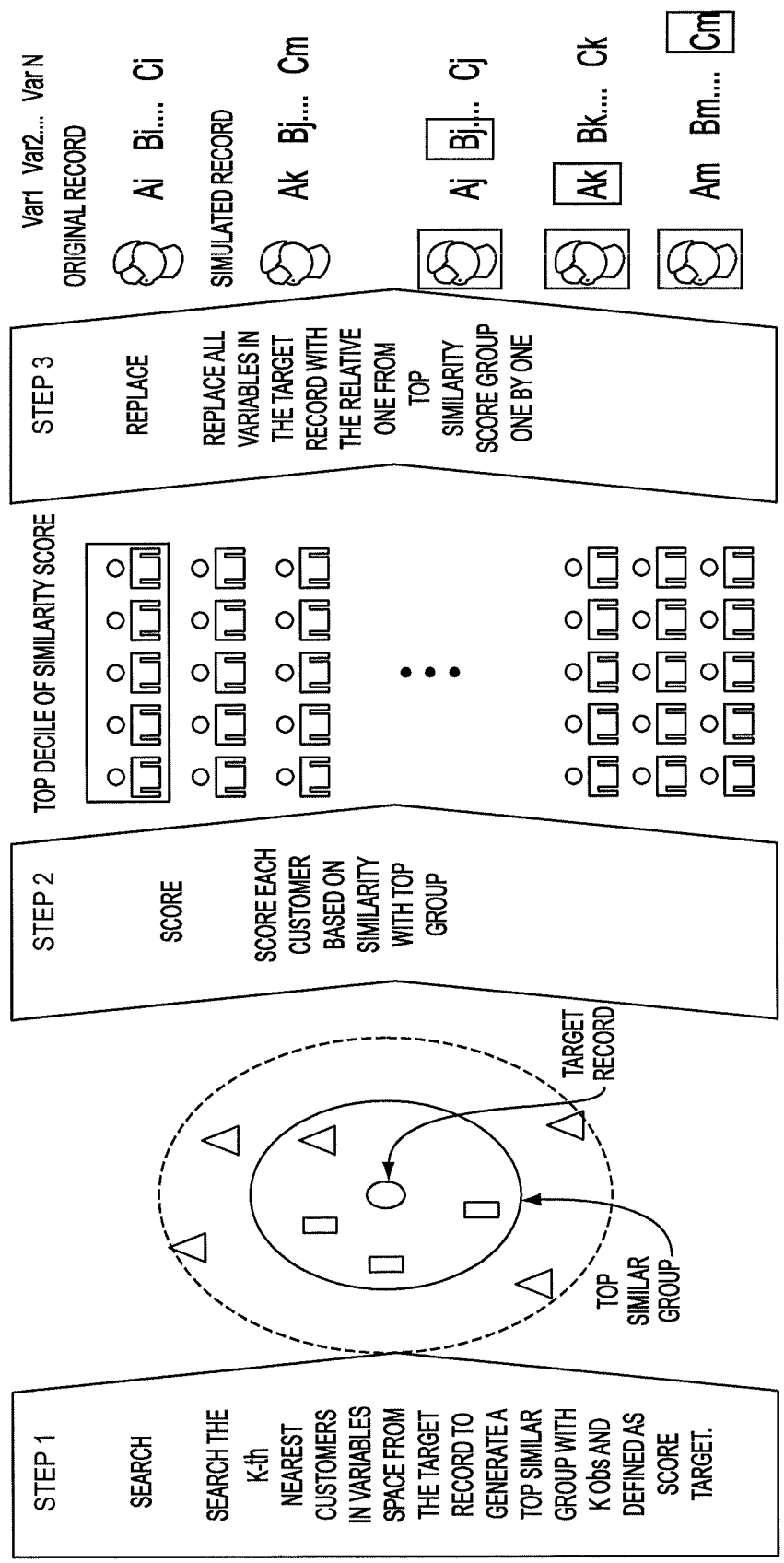
FIG. 1 is a diagram illustrating the methodology of an embodiment of the present invention.

Increasingly, analysts are demanding greater access to micro-data in direct marketing. Micro-data refers to, e.g., a set of records that include information on the individual or business entity level, as opposed to macro data which refers to data representative of a group. For example, an insurance company may seek access to the customer records of a bank to allow the insurance company to market its products to the customers of the bank. In such circumstances, in exchange for sharing its data, the insurance company may pay the bank a commission upon the sale of insurance products to the bank's customers. In this arrangement, both the insurance company and the bank are interested in selling as many insurance products as possible to the bank's customers. The embodiments described herein relate to the foregoing context. However, this context is exemplary only; the invention is applicable in other contexts.

Predictive models on customers' willingness to purchase goods or services rely on depersonalized individual level records. However, regulations and laws prevent releasing personally identifiable information from a business' customer database to third parties for use in connection with the third parties' marketing efforts due to privacy and confidentiality concerns.

To address this problem, existing procedures allow analysts access to simulated datasets, which include fully or partially synthetic data. The existing methodologies involve use of multiple imputation techniques to generate the synthetic datasets.

Imputation is a way to fulfill missing data with substituted values. It captures the distribution of variables and also each variable's relationships with other factors. It then relies on the value of other factors to replace the missing data for each variable. For example, if there are 1,000 observations with age, gender, income, credit limit information, and the age of the 1,000 observations could be simulated. Using traditional methodologies, the age information for 500 of the observations is randomly deleted, and then imputation is used to generate the simulated age for those records. After the process, 500 records will have a simulated age. A similar process is followed for the remaining variables to arrive at simulated values for all variables.

The following provides an example of multiple imputation. Table 1 shows missing data for Factor 1. Table 2 shows simulated data for Factor 1 using imputation.

TABLE 1

| Observations | Factor 1 | Factor 2 | Factor 3 | ... | ... | Factor 9 | Factor 10 |
|---|---|---|---|---|---|---|---|
| 1 | real data | real data | real data | real data | real data | real data | real data |
| 2 | | | | | | | |
| 3 | | | | | | | |
| 4 | | | | | | | |
| 5 | | | | | | | |
| ... | empty (no information or be deleted) | | | | | | |
| ... | | | | | | | |
| ... | | | | | | | |
| 997 | | | | | | | |
| 998 | | | | | | | |
| 999 | | | | | | | |
| 1000 | | | | | | | |

TABLE 2

| Obser-vations | Factor 1 | Factor 2 | Factor 3 | ... | ... | Factor 9 | Factor 10 |
| --- | --- | --- | --- | --- | --- | --- | --- |
| 1 | real data | real data | real data | real data | real data | real data | real data |
| 2 | | | | | | | |
| 3 | | | | | | | |
| 4 | | | | | | | |
| 5 | | | | | | | |
| ... | simulated | | | | | | |
| ... | through | | | | | | |
| ... | imputation | | | | | | |
| ... | based on | | | | | | |
| 997 | the equation | | | | | | |
| 998 | with other | | | | | | |
| 999 | factors | | | | | | |
| 1000 | | | | | | | |

The process applied to Factor 1 is then repeated one factor after another. In other manners of using multiple imputation, several simulated factors are generated at the same time. The simulating process may be repeated and several simulated datasets can be combined together in order to remove potential bias.

Although multiple imputation works to hide confidential information and prevent tracing a synthetic customer record back to a real customer record, it does not generate the most optimal synthetic data which is the most similar to the original dataset. Multiple imputation methodologies require that missing values in the original database be filled before the methodology can be implemented. This methodology is used in connection with market survey and does not work with large bodies of data where there is an attempt to observe an observation's position within the entire database and create a synthetic description of that observation.

Described herein is a system and method for generating an optimal synthetic data set which solves the problem of performing analytics while preventing disclosure of the original data. The preferred embodiments of the invention employ the nearest neighbor searching algorithm and the propensity score method. This methodology results in a statistical model which generates a synthetic data set with the computational efficiency to describe the original records by satisfying all statistical characteristics while eliminating the risk of being able to match any record back to the original record.

As described previously, the demand for access to micro-data describing personal level financial behavior, consumption patterns, and credit history records is increasing in the direct marketing business. Analysts rely on such data to generate predictive models on customers' willingness to buy financial products, including insurance products. However, the use of banks'/other institutions' customer data by third-parties raises concerns regarding personal data confidentiality and privacy protection. Laws and regulations in many countries forbid disclosure of personal data and other sensitive information to differing degrees. Further, some institutions limit the variables they are willing to disclose or restrict the usage of data they store. Contracts between institutions and customers relating to privacy and confidentiality are also typically in place and must be honored.

Fully or partially synthetic data developed through multiple imputation methodologies are traditionally used to solve the problem of limiting/eliminating disclosure of personal information, as described previously. This approach focuses on the use of surveys. Further, this approach treats the whole population as observed and unobserved units. The latter relies on the former to fill missing values or sensitive information by using multiple imputation. Through imputation and random selection, virtually none of the data in the original sample is found in the synthetic set. Instead, the data included in the synthetic set are simulated and cannot be traced back to the original set.

Thus, multiple imputation fulfills the goal of generating synthetic data in compliance with privacy laws and regulations. However, it is limited in that synthetic data generated in this way does not give consideration to preserving the statistical properties of the original data. Thus, the relations among variables may not be accurate. In addition, there are no missing values in the original database, as there are in most survey applications of multiple imputation.

In the direct marketing business, it is important to capture the structure and information of the original data, while avoiding using any of the actual original data. The traditional approach that provides a sample survey on the whole population may be useful in that it can provide additional information based on the survey samples or to fill gaps in the original dataset.

However, the traditional approach is not optimal for simulating the whole dataset. This is especially true in the instance in which one company (e.g., an insurance company) seeks access to the data of another company's customers (e.g., a bank's customers), but the actual data cannot be provided because of privacy laws and obligations. However, the bank still wants to the insurance company to maximize the revenue generated from the bank's customer database. This calls for building predictive models based on micro-data. Generating synthetic data with the information of the original data set incorporated into the simulating process is a better approach than the existing multiple imputation methodologies.

Described herein is a system and method that accurately simulates the original observations (i.e., customer records) by identifying the records that are most similar. This approach avoids having incorrect distributional assumptions built into the model and passed on to the synthetic data set as used in current methodologies (i.e., existing methodologies do not work to create an accurate, simulated copy the original dataset and are not focused on capturing a relative position of a single record in the dataset). At the same time, this approach avoids any potential risk of matching back to records in the original dataset. The methodology builds a more accurate synthetic dataset that solves the problem of limiting/eliminating disclosure.

FIG. 1 illustrates an embodiment of the methodology. As illustrated in FIG. 1, the systems and methods described herein simulate each individual record from the original dataset, to capture the needed information and preserve the record's characteristics, and ensure that the generated record cannot be traced back to the original. In so doing, the methodology combines the nearest neighbor algorithm with the propensity score process and subject to the optimization theory.

The following provides a description of the theoretical foundation for the disclosure limitation problem. The following exemplary facts are assumed to illustrate the synthetic data problem. There is a sample of size N, with individuals represented by $X=(X_i; i=1, 2, \ldots, N)$, and there are M variables available for all N observations, with $X_i=(x^1, x^2, \ldots, x^M)$. By way of specific example, in the banking context, the data may relate to credit cards and the variables can be, e.g., with reference to a customer, Age, Gender, Address, Income, Credit Limit, Balance, Frequency of Transactions within a Period, any single transaction record, Amount of Cash Withdrawn, and Payment Amount.

Each observation itself is the target. The purpose is to simulate another dataset $T=(T_i; i=1, 2, \ldots, N)$ with the same variables. The simulated sample should resemble the original dataset by maintaining all the distributions, correlations and other statistical properties between variables and observations (e.g., maintaining the means, maximums, minimums, standard deviations of certain variables, and also the position of each particular record within the entire dataset). For example, if there is a person A in the original dataset who is ranked in the top 5% in the dataset in terms of the probability to buy a particular product, there should be a synthetic record of person A in the synthetic dataset who is also ranked in the top 5% in terms of probability to buy that same product.

Thus, in the banking context example, the purpose may be to target a certain individual's purchase preference (e.g., how likely that individual is to buy financial products), and the method aims to capture each individual's characteristics that may be useful to tell whether the individual will buy or not, instead of only the statistical information about the entire database.

In order to avoid using personal information, the generated dataset must be different from the original one, meaning there is no identical record in both datasets. To solve the problem of limiting/eliminating disclosure of data from the original set in the synthetic set, the synthetic problem can be defined as minimizing the difference between the original and synthetic sample space.

In extreme situations, records with outlier values are quite different from all other records. Even after simulation and transformation, it could be possible to trace back and identify the original record using the synthetically generated record, which is not permissible. Therefore, in the preferred embodiment, such outliers are excluded at the beginning of the process. While it is possible to implement the inventive method without excluding outliers, the preferred approach is to eliminate them for data cleansing purposes and to avoid bias during modeling process. There are different methodologies that can be used to exclude outliers. One such methodology is based on each variable's summary statistics, as follows:

S is an observations dataset excluding the outliers, with variables defined in the same manner as above. S is a subset of X, with each element $$s_i; i=1,2, \ldots, n \in X_i; i=1,2, \ldots, N \qquad (1)$$

subject to $$\left\{ s_i^j \left| \frac{\sum_{i=1}^{N} x_i^j}{N} - 5\sqrt{\frac{1}{N-1}\sum_{i=1}^{N}\left(x_i - \frac{\sum_{i=1}^{N} x_i^j}{N}\right)^2} \leq \right.\right.$$

$$\left. s_i^j \leq \frac{\sum_{i=1}^{N} x_i^j}{N} + 5\sqrt{\frac{1}{N-1}\sum_{i=1}^{N}\left(x_i - \frac{\sum_{i=1}^{N} x_i^j}{N}\right)^2} \right\} \qquad (2)$$

In the above equation, superscript j represents a particular variable, e.g., if there are M variables in total, j is the $j^{th}$ within the M variables. Here, the criterion is that, for each record, once it includes any variable beyond a certain number of standard deviations from its mean value, the whole record may be deleted. In practice, whether a particular record will be deleted may depend on the judgment of the analyst or the business need. Therefore, only those with all variables within a number of standard deviations, e.g., five standard deviations, will remain in the subset of $S_i$ with n observations. The synthetic process described in the following is based on this subset, in the preferred embodiment. The simulated dataset Y will be exactly the same size as $S_i$.

In one example, five standard deviations is used in the foregoing portion of the methodology. However, in other instances, a different number of standard deviations can be used, within the scope of the present invention. In practice, the number of standard deviations used can vary based on the quality of the data or other characteristic of dataset in the modeling process. For example, if the records within a group of records are very similar to each other, the number of standard deviations may be smaller and, conversely, if the records within a group of records are quite different, the number of standard deviations will be larger.

Referring now to the methodology of the present invention, the Euclidian Distance between two records $x_i$ and $x_j$ in the original and synthetic dataset respectively is represented as follows:

$$d(x_i, x_j) = \|x_i - x_j\| = \sqrt{\sum_{j=1}^{M}\left(\frac{x_i^j - x_j^j}{\max x^j - \min x^j}\right)^2} \qquad (3)$$

Here, in order to avoid the influence of different scales on variables, the Euclidian Distance for each variable is normalized to 1.

The reference to scales here can be explained as follows. For different kinds of variables, there are also different scales. For example, referring to age, the value would most likely be between 0 to 100 and, referring to income, the value may be between 0 to 1,000,000,000. It would not be possible to compare these two variables directly. The typical approach for comparing these variables would be to use normalization, in which the maximum is equal to 1 and the minimum is equal to 0, and other numbers are distributed between them based on their value. Through this process, two variables can be compared without using their absolute numbers. So, for example, within a dataset, the age is between 0 to 100 and income is between 50,000 to 200,000. For record A, the age is 50 years old, so it will become 0.5 in the range of 0 to 100; the income is 100,000 per year, so it will become 0.33 in the range of 50,000 to 200,000. For record B, the age is 30 years old, which will be 0.3; and the income is 125,000 per year, which will be 0.5. One can determine how far away these two records are by calculating the sum of the distance for these two variables, which is the normalized value $(ageA-ageB)^2+(incomeA-incomeB)^2=(0.3-0.5)^2+(0.5-0.3)^2=0.08$. Without normalization, the distance will become $(50-30)^2+(125,000-100,000)$, which would not be useful because the result will be unduly influenced by income.

Referring back now to the methodology, $Corr(x_i,x_j)$ is defined as the correlation coefficient of any two variables $x_i$ and $x_j$ on the observation dataset. Since there are M variables in the dataset, correspondingly there is a correlation matrix $\beta^X$ describing the correlations between variables in the sample space.

$$\beta^X = \begin{bmatrix} 1 & \beta^{1,2} & \beta^{1,3} & \dots & \beta^{1,M} \\ \beta^{2,1} & 1 & \beta^{2,3} & \dots & \beta^{2,M} \\ \beta^{3,1} & \beta^{3,2} & \beta^{3,3} & \dots & \beta^{3,M} \\ \vdots & \vdots & \vdots & \ddots & \vdots \\ \beta^{M,1} & \beta^{M,2} & \beta^{M,3} & \dots & 1 \end{bmatrix} \quad (4)$$

Referring back to the problem to be solved, (i.e., avoiding disclosure of private information), a dataset Y is to be generated which is as similar as possible to the target dataset S.

Thus, for example, in the context of direct marketing of financial products, where the purpose is to target who will buy a product, the goal is to rank an individual's purchasing preference based on certain factors. It may be that individuals of a certain gender, income level and education level will be more likely to buy a particular type of insurance. It will be important to retain a record for this individual in the synthetic dataset that includes those particular characteristics for each individual. By way of a specific example, there is a record for a person in the original dataset who is middle class, 39 years old, male, married, works for Cigna and lives in the suburbs of Hartford, Conn., with 2 children and an annual salary of 210,000 USD before tax. In the synthetic dataset, the record for this person will reflect a married male, having more than 1 child, around 40 years old, works for the insurance industry, lives in a town near Hartford with annual income of around 200,000.

The synthetic dataset problem is then defined as computing a group of the nearest neighbors k using distance $d(x_i, x_j)$ and valuing this group as 1 in dependent variables and 0 in other records, and then calculating the correlation coefficient to find out the optimal deciles to be replaced, as shown in following minimum functions, $$\begin{cases} \min \sum_{j=1}^{k} \|x_i - x_j\| \\ \min |\beta^T x - y| \end{cases} \quad (5)$$

subject to the following constraint $$x_i \neq x_j, \ i=1,2,\dots,n; \ j=1,2,\dots,n \quad (6)$$

Equation (5) is the relative synthetic problem, the solution to which is described herein. Note that problem defined by equation (5) refers to the k-nearest neighbors problem (i.e., a pattern recognition methodology used to classify objects) and the propensity score problem (i.e., a methodology that involves a linear combination of covariates between variables).

The "nearest neighbor", in the customer data example, refers to the person's record that is sufficiently similar to the target record with regard to certain characteristics. For example, if an individual lives in a middle-class community, and his neighbor is very similar to him in terms of his career stage, the neighbor's career stage will be used to describe that of the individual. If another neighbor is similar to the individual in terms of financial status or sports behavior, this kind of information will be used to replace that of the individual. In the end, there will be a new synthetic record of a person who looks very similar to the individual but cannot be traced back using data.

The constraint referred to in the foregoing is used to make sure that this person's own information is not used to replace itself. Thus, for each record in the original dataset, the goal is to generate a new record to replace it. The newly generated records should be the most similar to the records in the original data set and maintain the same statistical structure compared to the original dataset, without allowing for tracing back to the original records.

The set of equation solutions for the nearest neighbors searching is now described.

Normally, use of a propensity score is a suitable way to match observations from the treatment group with the control group. The challenge here is that only one record (e.g., simulating one customer record at a time) is not enough to build a propensity score model.

In order to fully develop the solution for the problem defined by equation (5), a group of observations needs to be generated to represent the records used in the next step (i.e., the propensity score model). In the preferred embodiment of the present invention, the nearest neighbor algorithm is introduced to solve this task.

In connection with the development of the nearest neighbor methodology, a simplified K-nearest neighbor algorithm (K-NN) rule is used, in search for the equal nearest neighbor classifier. Considering that the samples of Bayes decision boundary were crucial to K-NN rule, only the samples near the decision boundary need be stored. The nearest neighbor search, also known as the similarity search or closest point search, is an optimization problem to find closest points in metric spaces. The problem is described as follows: given a set S of points in a metric space M and a query point $q \in M$, find the closest point in the set S to q. In some embodiments, M is taken to be d-dimensional Euclidean space and distance is measured by Euclidean distance.

As pattern recognition for classifying objects based on closest training examples in the feature space, K-NN involves instance-based learning where function is only approximated locally and computation is deferred until classification.

For each row in the target dataset that needs to be classified, the distance d of it from all other variables is computed. The K nearest neighbors are examined and classified (i.e., for each row/record, the nearest neighbors are examined and the whole dataset is classified into two groups, one belonging to the nearest neighbor labeled as '1' and another that does not belong labeled as '0'. This classification is then assigned to the row $x_i = (x_i^1, \dots, x_i^M) | i = 1, 2, \dots, n]$ as the target group in the next propensity score step. Other are treated as the control group (i.e., within the entire dataset, some of the records are selected as a target group based on the nearest neighbor algorithm; the remaining records in the dataset are the control group.

The set of equation solutions for building optimal similarity group are now described.

After setting up a control group to represent a certain record through the nearest neighbor searching algorithm, the methodology involves ranking records in the subsets S based on their similarity with the target group. For this purpose, preferred embodiments of the present invention employ a propensity score matching (PSM) methodology. PSM is a statistical matching technique that attempts to estimate the effect of a treatment obtained from simply comparing outcomes among units that receive the treatment versus to those that does not for observational studies.

Here, PSM is used to match the treatment group (i.e., the target group obtained through K-NN) and the control group. The propensity score is the conditional probability (P) that an individual belongs to the treatment group. It is functionally related to the covariates (X, in a vector format), noted as the logit model of $$\ln\left(\frac{P}{1-P}\right) = \beta^T X,$$

indicating the natural logarithm of the odds (i.e., the ratio of P to 1−P) is a linear combination of covariates, X. The propensity score estimated by a function of $$\hat{P} = \frac{e^{\hat{\beta}X}}{1+e^{\hat{\beta}X}},$$

summarizes the distribution information of all potential covariates.

Using PSM, a unit such as person can be assigned to a particular treatment given a set of observed covariates. Therefore, the treatment group and control group can be balanced. One of the key advantages of using PSM is that, by degenerating a set of covariates into a single score, it allows for balancing treatment and control groups on a large number of covariates without losing a large number of observations. Propensity scores are used to reduce selection bias by equating groups based on these covariates.

By way of further explanation, each record is associated with pieces of information/data (i.e., variables) which form a matrix. In order to determine the relationship between each record, you will also get a matrix through calculating the covariates between variables are calculated, which also forms a matrix. In order to understand the information that is conveyed through the matrix, PSM is used to put the complex statistical results together to generate a simple probability or score. Assigning a score to each record allows for ease of understanding what information is conveyed by the record.

Since the true propensity score is unknown, a model based estimation procedure has been developed in the literature. The broadly used logit model for the propensity score is a multistep approach: (1) selecting the powerful covariates—i.e., those that distinguish the treatment and control groups the most; (2) including the selected covariates and their interaction and/or quadratic terms in a one-equation logit model to estimate the propensity score using the maximum likelihood method; and (3) using the estimated propensity scores to match treatment and control groups, or stratify these two groups into equivalent subclasses. This procedure may include the stepwise model selection with repeating step (1) to step (3) until the closest treatment and control groups are achieved.

The inventive methodology for developing the optimal synthetic data set involves a modification of the propensity score balancing model, in which the propensity score is used to rank records in the original dataset based on the treatment and control group matching.

The procedure to develop the optimal synthetic data set starts with the development of a generic response model whose dependent variable set comprises a compilation of the target group (determined using the nearest neighbor searching described earlier) along with all of the independent variables available to model. This generic response model includes all of the factors related to describing personal characteristics of the consumers whose records were included in original dataset and can serve as the baseline for modeling that relies on the synthetic data.

Next described is developing the equivalent of the balancing scores or propensity scores, which allows for performing the optimization defined by (5). In a repeated replacing process, the propensity scores for each target group are developed, which represent a certain pattern for each record. The generated scores are then used to select a portion of the top deciles as a replacement pool for the target record. Thus, a record propensity score is developed for each customer, from customer 1 to consumer n, excluding the target customer as being included in the dependent variable. After determining the propensity scores, the top similarity group with relatively high scores is defined. The values of related variables in the top similarity group are used to replace the values of variables in the target record, one by one. In this way, the difference between the original record and simulated new record is minimized by controlling covariates through the propensity scores modeling process and through the K-NN algorithm.

By iterating the process of the nearest neighbor searching and propensity score model, the optimal synthetic data algorithm is built as a solution to the problem defined by equation (5) with the following parameters: (1) the independent variables set X is the set of variables derived from the customer files (e.g., those of the bank); (2) a subset S is identified, in one embodiment, to exclude the influence of outliers during the simulated process; (3) variable y is defined as an indicator of a target to a certain pattern classified by nearest neighbor searching process; (4) the final synthetic dataset Y is the set that is as similar as possible to the original subset S, with each record replaced by the matched counterparts in the top deciles of propensity scores.

An exemplary implementation of the model is now described. In recent years, synthetic data approaches have been used to create data that is available to the public from data collected from surveys in order to protect the identities of people responding to the surveys. The traditional approach to generate a synthetic dataset that relies on multiple imputation. This method is naturally built for survey data and assumes there is a very large number of people responding to the survey with missing information to be filled with the survey results selected by random sampling on the whole population. The methodology used in connection with the present invention does not involve filling in missing information; instead, it is used in a context in which a full record is available for every customer in the dataset. Also, the conventional method does not make any attempt to select the optimal synthetic data based on the statistical characteristics of original data.

Using the solution to equation (5) above, subject to the boundary conditions, along with the nearest neighbor searching and propensity score methods described above, models can be built that generate the best synthetic data set to represent the original data set, which synthetic data set can then be used in connection with direct marketing. This solves the competing tensions of companies (e.g., financial institutions such as banks or non-financial institutions) wanting to provide data describing their customers to their affinity partners so that the affinity partner can effectively market its products and services to the customers (and pay the bank or other institution a revenue-based commission) and the increasingly stringent laws and obligations on disclosure of personal information. Partners are charged with deriving the most value from the least information that can be provided through building accurate predictive models on purchasing behavior. There naturally arises a question of whether the synthetic data used to build predictive models well-represents the actual data in the sense that, at the aggregate level, the simulated data retains all the important statistical properties of the real data, but at the individual level none of the record can be traced back to a single customer. Data formulated this way serve two purposes. One is to enable for the soliciting the data deeper into the deciles and, meanwhile, complying with personal privacy regulations. Moreover, in order to serve needs of customer segmentation, predicting specific outcomes on product sales, it is important to maintain the specific covariates behind variables (i.e., the correlation between variables is maintained, namely, if two variables move together, then they should move together in the simulated dataset and if two variables move oppositely, then they should also move oppositely in the simulated dataset).

The results of using the inventive approach described herein are useful in a variety of different contexts. For example, they can be used to analyze customers' segmentations based on the recognition of patterns in their geo-demographic information, which helps in understanding what kinds of customers are in the affinity partner's pool. Cluster analysis is required for this purpose regardless of the correlation between variables and, thus, the approach focuses on the space concentration relationship of the customers' records which are simulated by the nearest neighbor approach. The results of this approach can also be used to generate, and analyze health and wellness scores of customers of an insurance company, which can help the insurance company determine how healthy their customers are in order to properly price personal health insurance, based on the demographic information, behavior patterns, as well as financial status of the customers. An accurate copy of customer-level information from the original dataset is required for this as well. By way of further example, the results of this approach can be used to maximize the response rate of leads from affinity partners to products offered by a company. A predictive model is built to fit the correlation between dependent sales variables and customers' other personal information. For this objective, the propensity scores model is employed which matches the treatment and control group while considering variables' covariates. Therefore, when the synthetic data is obtained for future analysis and model construction, the optimal dataset can be built for use in terms of depersonalized information and correlation among variables.

The optimized synthetic data approach helps develop a general synthetic data pool which can serve as the foundation for customer segmentation analysis and predictive model construction. The cluster analysis will enable a better understanding of prospects from affinity partners. More information on customers' characteristics can be revealed. A deeper understanding of the customers allows for fitting a better model to investigate people's willingness to buy insurance products, to generate more revenues and avoid claim risks for insurance products.

Figure 2:
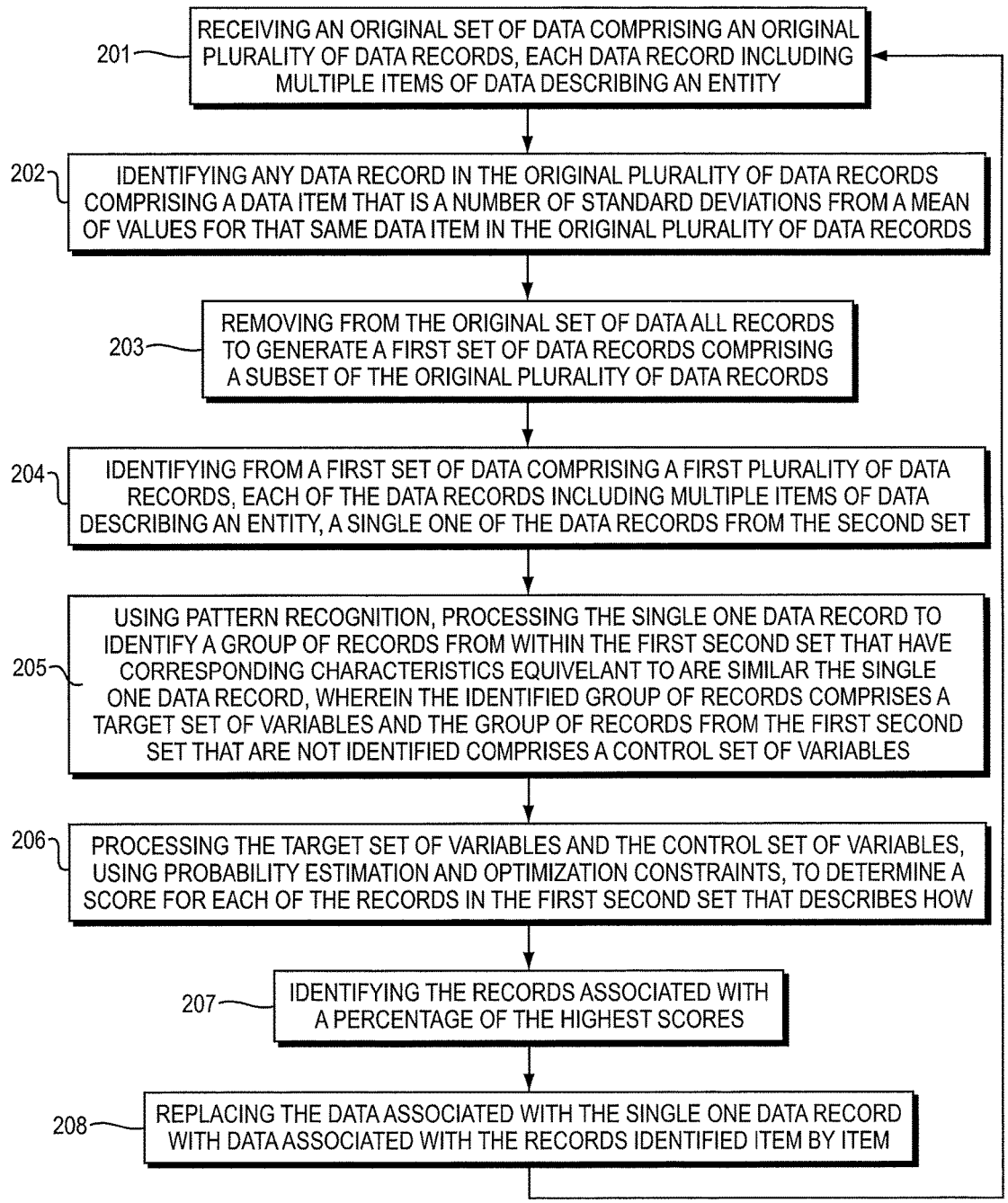
FIG. 2 is a diagram illustrating further the methodology of an embodiment of the present invention.

The computer implemented methodology of the present invention involves the following steps, in an exemplary embodiment, with reference to FIG. 2. An original dataset comprising records containing data is received (step 201). Outliers may be identified (step 202) and deleted (step 203) after analyzing the distribution of the original dataset. For example, the original dataset may include 10,000 records and, after removing outliers, 9,500 records remain. The process then commences with any single record on which to perform the simulation process (step 204). The nearest neighbor algorithm is employed to identify a group of records that are very similar to the single record. The identified group are referred to as the target variables and marked as "1". The remaining records that are not selected by the nearest neighbor algorithm are marked as "0". With the results from this step (step 205), the records of the original dataset are divided into group "1" and group "0". The propensity model is introduced to build a prediction model. The prediction model scores the entire original dataset to tell how similar each of the records in the original dataset is to the single record selected at the start of the process (step 206). The top, e.g., 10% of the records (other percentages can be used within the scope of the present invention) are scored as the most similar records to the originally selected single record (step 207). Those records are then used to replace the information in the originally selected single record, one item of data at a time, to generate a new simulated record (step 208). The process of simulating the record is optimized through the restrictive boundary conditions in the equation described above. The foregoing steps are then repeated for each record in the original dataset and the results are saved in a database as the simulated dataset.

While the K-nearest neighbors and the propensity score are two theories which are generally known methodologies used for pattern recognition and probability estimation, the inventive system and method employs these methodologies in a manner (described in detail herein) for generating a synthetic dataset while ensuring privacy of the data in the original dataset is not compromised.

Figure 3:
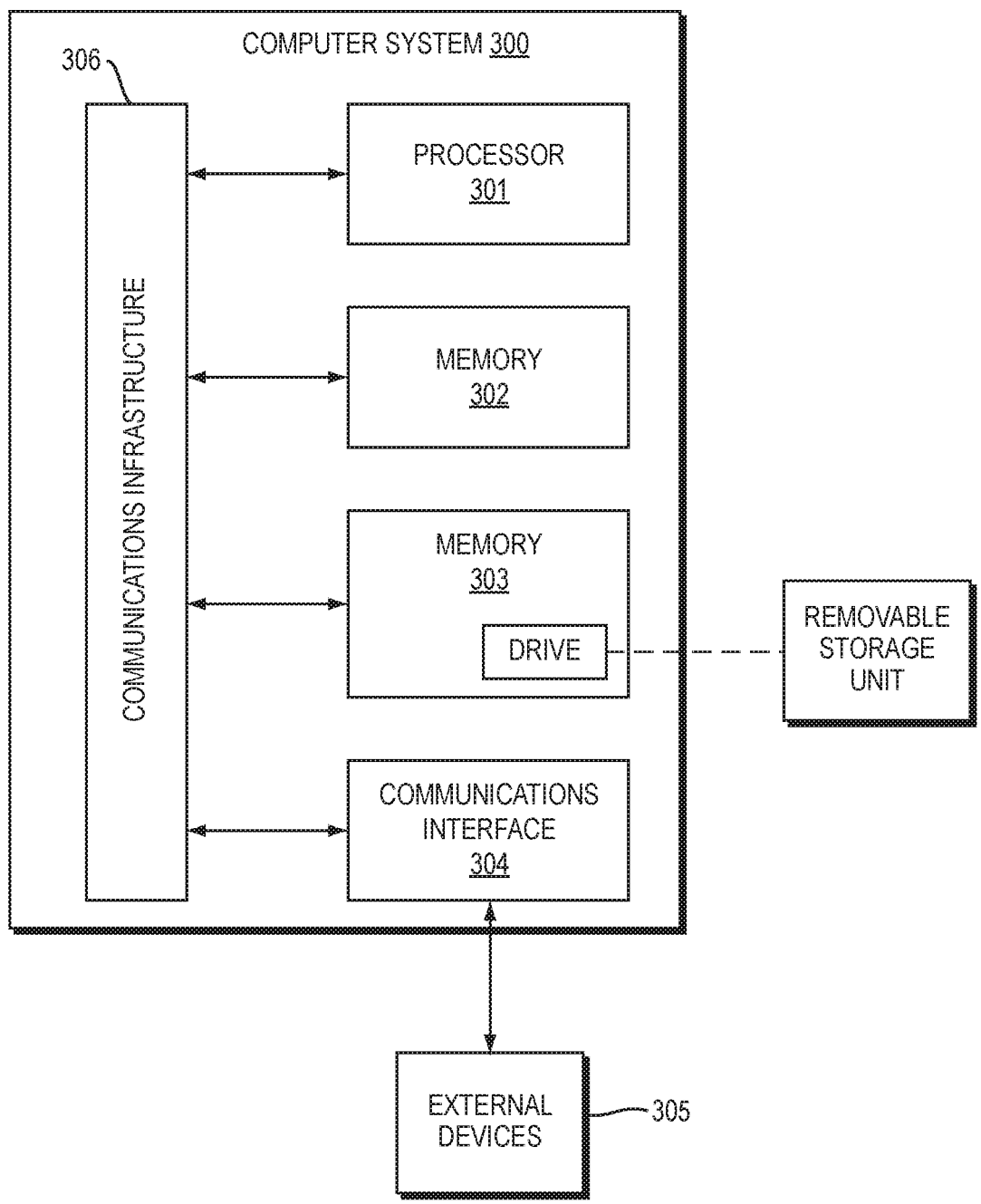
FIG. 3 is a diagram illustrating an exemplary computer system in which the methodology can be carried out.

An exemplary computer system, including computer hardware, that may be used to implement the methods of the present invention is now described with reference to FIG. 3. One skilled in the art will recognize that the described architecture is exemplary only and variations on the system described below can be used within the scope of the present invention.

Computer system 300 comprises hardware, as described more fully herein, that is used in connection with executing software/computer programming code (i.e., computer readable instructions) to carry out the steps of the methods described herein.

Computer system 300 includes one or more processors 301. Processor 301 may be any type of processor, including but not limited to a special purpose or a general-purpose digital signal processor. Processor 301 may be connected to a communication infrastructure 306 (for example, a bus or network). Various software implementations are described in terms of this exemplary computer system. After reading this description, it will become apparent to a person skilled in the art how to implement the invention using other computer systems and/or computer architectures.

Computer system 300 also includes one or more memories 302, 303. Memory 302 may be random access memory (RAM). Memory 303 may include, for example, a hard disk drive and/or a removable storage drive, such as a floppy disk drive, a magnetic tape drive, or an optical disk drive, by way of example. Removable storage drive reads from and/or writes to a removable storage unit (e.g., a floppy disk, magnetic tape, optical disk, by way of example) as will be known to those skilled in the art. As will be understood by those skilled in the art, removable storage unit includes a computer usable storage medium having stored therein computer software and/or data.

In alternative implementations, memory 303 may include other similar means for allowing computer programs or other instructions to be loaded into computer system 300. Such means may include, for example, a removable storage unit and an interface. Examples of such means may include a removable memory chip (such as an EPROM, or PROM, or flash memory) and associated socket, and other removable storage units and interfaces which allow software and data to be transferred from removable storage unit to computer system 300. Alternatively, the program may be executed and/or the data accessed from the removable storage unit, using the processor 301 of the computer system 300.

Computer system 300 may also include a communication interface 304. Communication interface 304 allows software and data to be transferred between computer system 300 and external devices. Examples of communication interface 304 may include a modem, a network interface (such as an Ethernet card), and a communication port, by way of example. Software and data transferred via communication interface 304 are in the form of signals, which may be electronic, electromagnetic, optical, or other signals capable of being received by communication interface 304. These signals are provided to communication interface 304 via a communication path to external devices 305. The communication path carries signals and may be implemented using wire or cable, fiber optics, a phone line, a wireless link, a cellular phone link, a radio frequency link, or any other suitable communication channel, including a combination of the foregoing exemplary channels.

The terms "non-transitory computer readable medium", "computer program medium" and "computer usable medium" are used generally to refer to media such as removable storage drive, a hard disk installed in hard disk drive, and non-transitory signals, as described herein. These computer program products are means for providing software to computer system 300. However, these terms may also include signals (such as electrical, optical or electromagnetic signals) that embody the computer program disclosed herein.

Computer programs are stored in memory 302 and/or memory 303. Computer programs may also be received via communication interface 304. Such computer programs, when executed, enable computer system 300 to implement the present invention as discussed herein. Accordingly, such computer programs represent controllers of computer system 300. Where the invention is implemented using software, the software may be stored in a computer program product and loaded into computer system 300 using removable storage drive, hard disk drive, or communication interface 304, to provide some examples.

The invention is implemented using a computer system specially programmed with computer readable instructions to carry out the methodology, as described further herein. As will be understood to those skilled in the art, and described more fully herein, use of a computer is essential, particularly for performing the method accurately and at the scale needed to be useful in this context, due at least to the complex nature of the algorithms employed and the amount of data that is to be processed to generate the synthetic data set.

The complexity of the process depends on the number of observations whose records need to be synthesized. For example, assume a dataset contains records for N observations (e.g., customers) and a synthetic dataset is to be generated in accordance with the inventive methodology. Each time a record is to be generated, the scoring and selection process described herein must be undertaken (i.e., run N times). At least part of the complexity lies in the calculation of scores in the propensity model. Such complexity is represented by $O(N)$. The complexity involved in ranking the score is represented by $O(N \ln N)$. Thus, the complexity of both these processes together is represented as $O(N*N*N \ln N)=O(N^3 \ln N)$, where N is the number of observations. For a dataset containing ten thousand ($10^4$) customers, for example, then the calculations must be performed approximately $10^{4^3} \ln 10^4 = 9.21*10^{12}$ times. Such calculations are not possible to complete manually in a suitable time frame, and with sufficient accuracy, in order to be effective.

In a typical exemplary embodiment, a bank or a credit card company will have several hundred thousand customers. In general, the larger the number of customers, the better the model would be. The minimum number of records needed depends on the number of variables. Minimum, here, refers to the minimum number of records needed to implement the inventive methodology such that it is impossible to trace back to the original record from the synthetic record. The minimum number is determined, based on the number of variables, as follows. If the dataset contains two variables, $2^2/0.1=40$ records are required to generate an impossible-to-trace-back dataset. If the dataset contains three variables, $3^2/0.1=90$ records are needed. Generally, a bank or credit card company's customer information would have at least three, and likely more, variables per observation. Thus, the inventive methodology requires at least 100 records for processing. However, from the perspective of the company that desires the synthetic data set for modelling, many more records are typically involved and/or required.

In connection with the propensity model, maximum likelihood estimation methods are used to calculate the parameters, as described more fully herein. This method involves solving a set of transcendental equations. The solution to this set of equations does not have a closed form meaning such that it is not possible to accurately determine the solution without use of a computer. More particularly, a computer is used to perform Newton iteration methodology to carry out an approximate solution as precisely as possible. Precision is important in connection with the present invention because, the larger the error, the higher the probability that the records are mis-ranked. Mis-ranking the records results in a high probability that the original record is replaced with an inappropriate one. Thus, precision of the solution aids in allowing the synthetic data record to most closely replicate the original data record.

Replacing the data in the original data set with the synthesized data, in accordance with the present invention as described more fully herein, involves randomly picking a value from another record to replace the original value. This allows for avoidance of tracing back to the original record. The random picking of a value must be performed by a computer and cannot be performed manually. If the random picking were performed by an analyst (a human), then the analyst himself may be able to trace back records of original dataset, which is not permitted or desirable. In order to eliminate this possibility of tracing back, a computer must be used to perform the random pick. Once the random pick command is issued by the computer, the computer provides a seed and performs a random pick from the candidate values. The seed is related to the command-issue time recorded in the computer. Once the command-issue time has passed, it is impossible to reproduce the same seed. Therefore, no one can reverse the process from the synthetic data and identify the original record from which the value was picked.

The output of the inventive methodology can be used to control a machine, such as a telephone, using an automatic telephone dialing system ("ATDS"). More particularly, the output of the inventive methodology is data relating to a consumer to whom a company, e.g., an insurance company, may want to market its products. The telephone numbers of such customers, which is included in the data that is the output of the present invention, may be stored in an ATDS and dialed without human intervention. While the methodology described herein to generate the synthesized data is new, use of ATDSs are known.

The invention improves technology in a variety of ways. First, for example, the invention improves the functioning of the computer. More particularly, using real customer data is highly inefficient in terms of computation because the name, address and other non-useful information of the consumers must be processed, along with the relevant information, or deleted upfront. Providing the relevant data with the personal information included results in more data being processed than is needed because modeling does not require personal information. If depersonalized data is required, the act of depersonalizing data requires programming of the computer to drop the information, which results in additional processing time for the computer. The synthetic data algorithm described herein enables a much more efficient computation because only relevant data needs to be processed. Data synthesis allows for creation and processing of only those data elements which are deemed useful without the overhead (and the risks) of carrying or deleting personal information.

Further, the invention results in improvements in the technical field of data synthesis. More particularly, the traditional methods of multiple imputation can protect customer information to some extent, but such methods do not protect the structure of the data. The present invention allows for the protection not only of the data, but the data structure as well.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

What is claimed is:

1. A computer-implemented method comprising:
   (a) identifying from a first set of data comprising a first plurality of data records, each of the data records including multiple fields each of which stores a variable describing an entity, a single data record, at least one of the variables being associated with personal information;
   (b) using pattern recognition, processing the single data record to identify a group of records from within the first set that have corresponding variables equivalent to the variables in the single data record, wherein the identified group of records comprises a target set of variables, the target set of variables comprising variables equivalent to the variables in the single data record and the group of records from the first set that are not identified comprises a control set of variables, the control set of variables comprising variables not equivalent to the variables in the single data record;
   (c) processing the target set of variables and the control set of variables, using probability estimation and optimization constraints, to determine a score for each of the records in the first set that describes a comparison of each of the records in the first set to the single data record;
   (d) identifying the records associated with each of the scores above a predetermined threshold; and
   (e) replacing the data that is a representative of the personal information and is associated with the single data record with data associated with the records identified in step (d) field by field under constraints of maintaining a correlation matrix of the multiple fields to maintain statistical characteristics of the first set of data and remove the personal information; and
   (f) building a predictive model based on at least the data associated with the records identified in step (d).

2. The computer implemented method of claim 1, further comprising:
   (f) receiving an original set of data comprising an original plurality of data records, each data record including multiple fields each of which stores a variable describing an entity;
   (g) identifying any data record in the original plurality of data records comprising a corresponding variable that is a number of standard deviations from a mean of values for that same variable in the original plurality of data records;
   (h) removing from the original set of data all records identified in step (g) to generate a first set of data records comprising a subset of the original plurality of data records.

3. The computer-implemented method of claim 1, further comprising:
   (i) identifying a second single data record from the first set; and
   (j) performing steps (b) through (e) on the second single data record.

4. A system comprising:
   memory operable to store at least one program;
   at least one processor communicatively coupled to the memory, in which the at least one program, when executed by the at least one processor, causes the at least one processor to perform a method comprising:
     (a) identifying from a first set of data comprising a first plurality of data records, each of the data records including multiple fields each of which stores a variable describing an entity, a single data record, at least one of the variables being associated with personal information;

(b) using pattern recognition, processing the single data record to identify a group of records from within the first set that have corresponding variables equivalent to the variables in the single data record, wherein the identified group of records comprises a target set of variables, the target set of variables comprising variables equivalent to the variables in the single data record and the group of records from the first set that are not identified comprises a control set of variables, the control set of variables comprising variables not equivalent to the variables in the single data record;

(c) processing the target set of variables and the control set of variables, using probability estimation and optimization constraints, to determine a score for each of the records in the first set that describes a comparison of each of the records in the first set to the single data record;

(d) identifying the records associated with each of the scores above a predetermined threshold; and (e) replacing the data that is a representative of the personal information and is associated with the single data record with data associated with the records identified in step (d) field by field under constraints of maintaining a correlation matrix of the multiple fields to maintain statistical characteristics of the first set of data and remove the personal information; and (f) building a predictive model based on at least the data associated with the records identified in step (d).

5. The system of claim 4, the method further comprising:

(f) receiving an original set of data comprising an original plurality of data records, each data record including multiple fields each of which stores a variable describing an entity;

(g) identifying any data record in the original plurality of data records comprising a corresponding variable that is a number of standard deviations from a mean of values for that same variable in the original plurality of data records;

(h) removing from the original set of data all records identified in step (g) to generate a first set of data records comprising a subset of the original plurality of data records.

6. The system of claim 4, the method further comprising:

(i) identifying a second single data record from the first set; and (j) performing steps (b) through (e) on the second single data record.

7. A non-transitory computer readable storage medium having stored thereon computer-executable instructions which, when executed by a processor, perform a method comprising:

(a) identifying from a first set of data comprising a first plurality of data records, each of the data records including multiple fields each of which stores a variable describing an entity, a single data record, at least one of the variables being associated with personal information;

(b) using pattern recognition, processing the single data record to identify a group of records from within the first set that have corresponding variables equivalent to the variables in the single data record, wherein the identified group of records comprises a target set of variables, the target set of variables comprising variables equivalent to the variables in the single data record and the group of records from the first set that are not identified comprises a control set of variables, the control set of variables comprising variables not equivalent to the variables in the single data record;

(c) processing the target set of variables and the control set of variables, using probability estimation and optimization constraints, to determine a score for each of the records in the first set that describes a comparison of each of the records in the first set to the single data record;

(d) identifying the records associated with each of the scores above a predetermined threshold; and (e) replacing the data that is a representative of the personal information and is associated with the single data record with data associated with the records identified in step (d) field by field under constraints of maintaining a correlation matrix of the multiple fields to maintain statistical characteristics of the first set of data and remove the personal information; and (f) building a predictive model based on at least the data associated with the records identified in step (d).

8. The non-transitory computer readable storage medium of claim 7, the method further comprising:

(f) receiving an original set of data comprising an original plurality of data records, each data record including multiple fields each of which stores a variable describing an entity;

(g) identifying any data record in the original plurality of data records comprising a corresponding variable that is a number of standard deviations from a mean of values for that same variable in the original plurality of data records;

(h) removing from the original set of data all records identified in step (g) to generate a first set of data records comprising a subset of the original plurality of data records.

9. The non-transitory computer readable storage medium of claim 7, the method further comprising:

(i) identifying a second single data record from the first set; and (j) performing steps (b) through (e) on the second single data record.

* * * * *